United St
Sissel

[15] 3,640,605
[45] Feb. 8, 1972

[54] MECHANICALLY COMPENSATED ZOOM LENS SYSTEM

[72] Inventor: Harold N. Sissel, 133 S. Cedar Street, Glendale, Calif. 91205

[22] Filed: Nov. 12, 1970

[21] Appl. No.: 88,787

[52] U.S. Cl.................................................350/184, 350/214
[51] Int. Cl. .................................................G02b 15/16
[58] Field of Search..................................................350/184

[56] References Cited
UNITED STATES PATENTS 1,947,669  2/1934   Warmisham et al..................350/184
3,360,325  12/1967  Gustafson............................350/184

*Primary Examiner*—John K. Corbin
*Attorney*—James J. Ralabate, Franklyn C. Weiss, John E. Beck and Irving Keschner

[57] ABSTRACT

A mechanically compensated zoom lens system made up of three lens groups, the front lens group being fixed and the middle and rear lens groups being movable.

2 Claims, 1 Drawing Figure

PATENTED FEB 8 1972
3,640,605
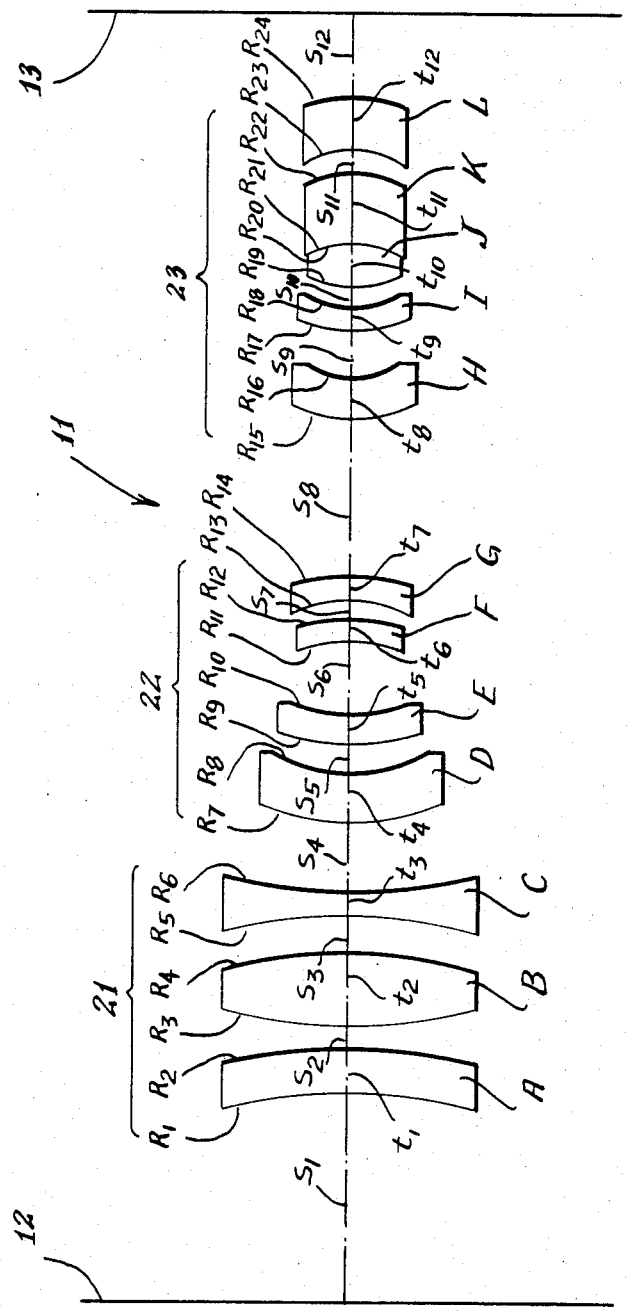
INVENTOR.
Harold N. Sissel
BY
Irving M. Kriegsman
ATTORNEY.

MECHANICALLY COMPENSATED ZOOM LENS SYSTEM

This invention relates to zoom lens systems. More particularly, this invention relates to mechanically compensated zoom lens systems for projecting images at finite conjugates for use in enlargers, table top projectors, microfilm projectors and the like.

An example of this type of zoom lens system can be found in U.S. Pat. No. 3,360,325.

It is an object of this invention to provide a new and improved zoom lens system.

It is another object of this invention to provide a new and improved mechanically compensated zoom lens system.

It is still another object of this invention to provide a mechanically compensated zoom lens system that is highly corrected for use at magnifications in the range from about 17 X to about 40 X and operating between object and image planes that are a fixed distance apart.

It is yet still another object of this invention to provide a zoom lens system in which the aberrations are well balanced for use in projecting different sizes of film area onto a constant size screen.

The above and other objects are achieved by constructing a zoom lens system according to this invention. Briefly, the zoom lens system is made up of three lens groups, the front lens group being fixed and the middle and rear lens groups being movable. The front lens group is made up of three lens components, the middle lens group is made up of four lens components and the rear lens group is made up of five lens components.

A clearer concept of the scope and purpose of the invention along with various advantages and features thereof will be obtained from the following detailed description taken in conjunction with the drawing.

In the drawing the sole FIGURE is an optical diagram of an embodiment of the invention.

Referring now to the drawing, the lens system as a whole is designated by reference numeral 11, the object plane of the lens system is designated by reference numeral 12 and the image plane of the lens system is designated by reference numeral 13.

As can be seen, the lens system 11 is made up of three lens groups, the front lens group being identified by reference numeral 21 and being fixed, the middle lens group being identified by reference numeral 22 and being movable, and the rear lens group being identified by reference numeral 23 and being movable. Lens group 21 is made up of a positive meniscus shaped element A concave to the front which is spaced in front of a double convex element B which is spaced in front of a double concave element C. Lens group 22 is made up of a positive meniscus shaped element D convex to the front which is spaced in front of a negative meniscus shaped element E convex to the front which is spaced in front of a positive meniscus shaped element F concave to the front which is spaced in front of a negative meniscus shaped element G concave to the front. Lens group 23 is made up of a positive meniscus shaped element H convex to the front which is spaced in front of a negative meniscus shaped element I convex to the front which is spaced in front of a double convex doublet made up of a double convex element J followed by a negative meniscus shaped element K concave to the front which is spaced in front of a negative meniscus shaped element L concave to the front.

The following two charts are examples of constructional data for two embodiments of the invention.

In the charts, the radii of curvature R, the thicknesses $t$, the spacings S, the indices of refraction Nd and the Abbe numbers V are all expressed in the customary manner.

CHART 1

| Group | Lens | Radius | Thickness | Spacing | Nd at 5,876 A. | V at 5,876 A. |
|---|---|---|---|---|---|---|
| 21 | A | $R_1=-6.3239$<br>$R_2=-2.8668$ | $t_1=0.167$ | $S_1=42.540$<br>$S_2=0.023$ | 1.589 | 61.3 |
|  | B | $R_3=2.3183$<br>$R_4=-20.3924$ | $t_2=0.204$ | $S_3=0.062$ | 1.658 | 50.9 |
|  | C | $R_5=-5.6631$<br>$R_6=1.8451$ | $t_3=0.190$ | $S_4=\begin{cases}0.534 \text{ at } 40\times\\0.760 \text{ at } 26\times\\0.510 \text{ at } 17\times\end{cases}$ | 1.658 | 50.9 |
| 22 | D | $R_7=0.6993$<br>$R_8=2.6237$ | $t_4=0.397$ | $S_5=0.058$ | 1.488 | 70.4 |
|  | E | $R_9=7.6463$<br>$R_{10}=0.5579$ | $t_5=0.085$ | $S_6=0.498$ | 1.589 | 61.3 |
|  | F | $R_{11}=-0.6937$<br>$R_{12}=-0.6118$ | $t_6=0.100$ | $S_7=0.020$ | 1.805 | 25.4 |
|  | G | $R_{13}=-0.6077$<br>$R_{14}=-2.5127$ | $t_7=0.068$ | $S_8=\begin{cases}1.144 \text{ at } 40\times\\0.461 \text{ at } 26\times\\0.027 \text{ at } 17\times\end{cases}$ | 1.589 | 61.3 |
| 23 | H | $R_{15}=0.9663$<br>$R_{16}=4.3651$ | $t_8=0.239$ | $S_9=0.356$ | 1.658 | 50.9 |
|  | I | $R_{17}=0.9693$<br>$R_{18}=0.6258$ | $t_9=0.146$ | $S_{10}=0.037$ | 1.805 | 25.4 |
|  | J | $R_{19}=0.6749$<br>$R_{20}=-0.3951$ | $t_{10}=0.230$ |  | 1.552 | 63.5 |
|  | K | $R_{21}=-0.3951$<br>$R_{22}=-0.6024$ | $t_{11}=0.447$ | $S_{11}=0.073$ | 1.805 | 25.4 |
|  | L | $R_{23}=-0.5516$<br>$R_{24}=-1.3758$ | $t_{12}=0.185$ | $S_{12}=\begin{cases}1.088 \text{ at } 40\times\\1.545 \text{ at } 26\times\\2.229 \text{ at } 17\times\end{cases}$ | 1.589 | 61.3 |

NOTE.—F.O.V.=17.16°. F/#=from F/3.52 to F/8.28. Zoom magnification range=40× to 17×. E.F.L.=From 1.149 to 2.583. Stop position=0.041 in front of element I. All dimensions are in inches.

CHART II

| Group | Lens | Radius | Thickness | Spacing | Nd at 5,876 A. | V at 5,876 A. |
|---|---|---|---|---|---|---|
| | | | | $S_1=42.461$ | | |
| | A | $R_1=-6.3286$ | $t_1=0.167$ | | 1.589 | 61.3 |
| | | $R_2=-2.8668$ | | | | |
| | | | | $S_2=0.023$ | | |
| 21 | B | $R_3=2.3193$ | $t_2=0.204$ | | 1.658 | 50.9 |
| | | $R_4=-20.3845$ | | | | |
| | | | | $S_3=0.062$ | | |
| | C | $R_5=-5.6679$ | $t_3=0.290$ | | 1.658 | 50.9 |
| | | $R_6=1.8454$ | | | | |
| | | | | $S_4=\begin{cases}0.532 \text{ at } 40\times\\0.762 \text{ at } 26\times\\0.515 \text{ at } 17\times\end{cases}$ | | |
| | D | $R_7=0.6996$ | $t_4=0.397$ | | 1.488 | 70.4 |
| | | $R_8=2.6234$ | | | | |
| | | | | $S_5=0.058$ | | |
| | E | $R_9=7.6515$ | $t_5=0.085$ | | 1.589 | 61.3 |
| | | $R_{10}=0.5582$ | | | | |
| 22 | | | | $S_6=0.498$ | | |
| | F | $R_{11}=-0.6937$ | $t_6=0.100$ | | 1.805 | 25.4 |
| | | $R_{12}=-0.6118$ | | | | |
| | | | | $S_7=0.020$ | | |
| | G | $R_{13}=-0.6076$ | $t_7=0.068$ | | 1.589 | 61.3 |
| | | $R_{14}=-2.5131$ | | | | |
| | | | | $S_8=\begin{cases}1.143 \text{ at } 40\times\\0.459 \text{ at } 26\times\\0.025 \text{ at } 17\times\end{cases}$ | | |
| | H | $R_{15}=0.9665$ | $t_8=0.239$ | | 1.658 | 50.9 |
| | | $R_{16}=4.3698$ | | | | |
| | | | | $S_9=0.356$ | | |
| | I | $R_{17}=0.9695$ | $t_9=0.146$ | | 1.805 | 25.4 |
| | | $R_{18}=0.6261$ | | | | |
| | | | | $S_{10}=0.037$ | | |
| 23 | J | $R_{19}=0.6749$ | $t_{10}=0.230$ | | 1.552 | 63.5 |
| | | $R_{20}=-0.3951$ | | | | |
| | K | $R_{21}=-0.3951$ | $t_{11}=0.447$ | | 1.805 | 25.4 |
| | | $R_{22}=-0.6024$ | | | | |
| | | | | $S_{11}=0.073$ | | |
| | L | $R_{23}=-0.5519$ | $t_{12}=0.185$ | | 1.589 | 61.3 |
| | | $R_{24}=-1.3764$ | | | | |
| | | | | $S_{12}=\begin{cases}1.084 \text{ at } 40\times\\1.539 \text{ at } 26\times\\2.220 \text{ at } 17\times\end{cases}$ | | |

NOTE.—F.O.V.=17.16°. F/#=from F/3.52 to F/8.28. Zoom magnification range=40× to 17×. E.F.L.=From 1.149 to 2.583. Stop position=0.041 in front of element I. All dimensions are in inches.

What is claimed is:

1. A mechanically compensated zoom lens system made according to the following chart of constructional data:

| Group | Lens | Radius | Thickness | Spacing | Nd at 5,876 A. | V at 5,876 A. |
|---|---|---|---|---|---|---|
| | | | | $S_1=42.540$ | | |
| | A | $R_1=-6.3239$ | $t_1=0.167$ | | 1.589 | 61.3 |
| | | $R_2=-2.8668$ | | | | |
| | | | | $S_2=0.023$ | | |
| 21 | B | $R_3=2.3183$ | $t_2=0.204$ | | 1.658 | 50.9 |
| | | $R_4=-20.3924$ | | | | |
| | | | | $S_3=0.062$ | | |
| | C | $R_5=-5.6631$ | $t_3=0.190$ | | 1.658 | 50.9 |
| | | $R_6=1.8451$ | | | | |
| | | | | $S_4=\begin{cases}0.534 \text{ at } 40\times\\0.760 \text{ at } 26\times\\0.510 \text{ at } 17\times\end{cases}$ | | |
| | D | $R_7=0.6993$ | $t_4=0.397$ | | 1.488 | 70.4 |
| | | $R_8=2.6237$ | | | | |
| | | | | $S_5=0.058$ | | |
| | E | $R_9=7.6463$ | $t_5=0.085$ | | 1.589 | 61.3 |
| | | $R_{10}=0.5579$ | | | | |
| 22 | | | | $S_6=0.498$ | | |
| | F | $R_{11}=-0.6937$ | $t_6=0.100$ | | 1.805 | 25.4 |
| | | $R_{12}=-0.6118$ | | | | |
| | | | | $S_7=0.020$ | | |
| | G | $R_{13}=-0.6077$ | $t_7=0.068$ | | 1.589 | 61.3 |
| | | $R_{14}=-2.5127$ | | | | |
| | | | | $S_8=\begin{cases}1.144 \text{ at } 40\times\\0.461 \text{ at } 26\times\\0.027 \text{ at } 17\times\end{cases}$ | | |
| | | $R_{15}=0.9663$ | | | | |

| Group | Lens | Radius | Thickness | Spacing | Nd at 5,876 A. | V at 5,876 A. |
|---|---|---|---|---|---|---|
| | H | $R_{16}$=4.3651 | $t_8$=0.239 | | 1.658 | 50.9 |
| | | $R_{17}$=0.9693 | | $S_9$=0.356 | | |
| | I | $R_{18}$=0.6258 | $t_9$=0.146 | | 1.805 | 25.4 |
| | | $R_{19}$=0.6749 | | $S_{10}$=0.037 | | |
| 23 | J | $R_{20}$=−0.3951 | $t_{10}$=0.230 | | 1.552 | 63.5 |
| | | $R_{21}$=−0.3951 | | | | |
| | K | $R_{22}$=−0.6024 | $t_{11}$=0.447 | | 1.805 | 25.4 |
| | | $R_{23}$=−0.5516 | | $S_{11}$=0.073 | | |
| | L | $R_{24}$=−1.3758 | $t_{12}$=0.185 | | 1.589 | 61.3 |
| | | | | $S_{12}=\begin{cases}1.088 \text{ at } 40\times\\1.545 \text{ at } 26\times\\2.229 \text{ at } 17\times\end{cases}$ | | |

NOTE.—F.O.V.=17.16°. F/=from F/3.52 to F/8.28. Zoom magnification range=40✕ to 17✕. E.F.L.=From 1.149 to 2.583. Stop position=0.041 in front of element I. All dimensions are in inches.

2. A mechanically compensated zoom lens system made according to the following chart of constructional data:

| Group | Lens | Radius | Thickness | Spacing | Nd at 5,876 A. | V at 5,876 A. |
|---|---|---|---|---|---|---|
| | | | | $S_1$=42.461 | | |
| | A | $R_1$=−6.3286 | $t_1$=0.167 | | 1.589 | 61.3 |
| | | $R_2$=−2.8668 | | $S_2$=0.023 | | |
| 21 | B | $R_3$=2.3193 | $t_2$=0.204 | | 1.658 | 50.9 |
| | | $R_4$=−20.3845 | | $S_3$=0.062 | | |
| | C | $R_5$=−5.6679 | $t_3$=0.190 | | 1.658 | 50.9 |
| | | $R_6$=1.8454 | | $S_4=\begin{cases}0.532 \text{ at } 40\times\\0.762 \text{ at } 26\times\\0.515 \text{ at } 17\times\end{cases}$ | | |
| | D | $R_7$=0.6996 | $t_4$=0.397 | | 1.488 | 70.4 |
| | | $R_8$=2.6234 | | $S_5$=0.058 | | |
| | E | $R_9$=7.6515 | $t_5$=0.085 | | 1.589 | 61.3 |
| 22 | | $R_{10}$=0.5582 | | $S_6$=0.498 | | |
| | F | $R_{11}$=−0.6937 | $t_6$=0.100 | | 1.805 | 25.4 |
| | | $R_{12}$=−0.6118 | | $S_7$=0.020 | | |
| | G | $R_{13}$=−0.6076 | $t_7$=0.068 | | 1.589 | 61.3 |
| | | $R_{14}$=−2.5131 | | $S_8=\begin{cases}1.143 \text{ at } 40\times\\0.459 \text{ at } 26\times\\0.025 \text{ at } 17\times\end{cases}$ | | |
| | H | $R_{15}$=0.9665 | $t_8$=0.239 | | 1.658 | 50.9 |
| | | $R_{16}$=4.3698 | | $S_9$=0.356 | | |
| | I | $R_{17}$=0.9695 | $t_9$=0.146 | | 1.805 | 25.4 |
| | | $R_{18}$=0.6261 | | $S_{10}$=0.037 | | |
| 23 | J | $R_{19}$=0.6749 | $t_{10}$=0.230 | | 1.552 | 63.5 |
| | | $R_{20}$=−0.3951 | | | | |
| | K | $R_{21}$=−0.3951 | $t_{11}$=0.447 | | 1.805 | 25.4 |
| | | $R_{22}$=−0.6024 | | $S_{11}$=0.073 | | |
| | L | $R_{33}$=−0.5519 | $t_{12}$=0.185 | | 1.589 | 61.3 |
| | | $R_{24}$=−1.3764 | | $S_{12}=\begin{cases}1.084 \text{ at } 40\times\\1.539 \text{ at } 26\times\\2.220 \text{ at } 17\times\end{cases}$ | | |

NOTE.—F.O.V.=17.16°. F/#=from F/3.52 to F/8.28. Zoom magnification range=40✕ to 17✕. E.F.L.=From 1.149 to 2.583. Stop position=0.041 in front of element I. All dimensions are in inches.

\* \* \* \* \*